US012432495B2

(12) United States Patent
Takemoto et al.

(10) Patent No.: US 12,432,495 B2
(45) Date of Patent: Sep. 30, 2025

(54) MICROPHONE MODULE AND MICROPHONE DEVICE

(71) Applicant: Panasonic Intellectual Property Management Co., Ltd., Osaka (JP)

(72) Inventors: Makoto Takemoto, Kanagawa (JP); Susumu Yoneta, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 174 days.

(21) Appl. No.: 18/537,314

(22) Filed: Dec. 12, 2023

(65) Prior Publication Data

US 2024/0137699 A1 Apr. 25, 2024

Related U.S. Application Data

(63) Continuation of application No. PCT/JP2022/017739, filed on Apr. 13, 2022.

(30) Foreign Application Priority Data

Sep. 3, 2021 (JP) ................................ 2021-143899

(51) Int. Cl.
*H04R 3/04* (2006.01)

(52) U.S. Cl.
CPC .......... *H04R 3/04* (2013.01); *H04R 2499/13* (2013.01)

(58) Field of Classification Search
CPC ... H04R 3/04; H04R 2499/13; H04R 2410/00
(Continued)

(56) References Cited

U.S. PATENT DOCUMENTS 4,414,433 A 11/1983 Horie et al.
6,104,818 A * 8/2000 Korner ................ H04R 19/016 381/113

(Continued)

FOREIGN PATENT DOCUMENTS

JP S5119856 Y1 5/1976
JP S5710598 A 1/1982

(Continued)

OTHER PUBLICATIONS

English Translation of International Search Report dated Jul. 19, 2022, for the corresponding International Patent Application No. PCT/JP2022/017739, 2 pages.

*Primary Examiner* — Xu Mei
(74) *Attorney, Agent, or Firm* — Seed Intellectual Property Law Group LLP

(57) ABSTRACT

A microphone module includes: a microphone element outputting a microphone signal representing collected sound; an amplifier circuit outputting an amplified signal obtained by amplifying a difference between the microphone signal and a reference voltage; a high-pass filter outputting a high-band amplified signal obtained by filtering the amplified signal; a buffer circuit outputting an audio signal obtained by buffering the high-band amplified signal; a first low-pass filter outputting a low-pass bias voltage obtained by filtering the audio signal superimposed on a DC power supply, and a separation circuit outputting an internal bias voltage obtained by removing the influence of an external circuit from the low-pass bias voltage. The second low-pass filter outputs the reference voltage obtained by filtering the internal bias voltage. A circuit from the high-pass filter to the amplifier circuit is set such that an open loop gain is smaller than 0 dB.

10 Claims, 8 Drawing Sheets

(58) Field of Classification Search
USPC ............... 381/91, 92, 98, 111–113, 120, 122
See application file for complete search history.

(56) References Cited

U.S. PATENT DOCUMENTS

| | | | | |
|---|---|---|---|---|
| 9,301,036 | B2 * | 3/2016 | Akino | H04R 19/00 |
| 9,710,000 | B2 * | 7/2017 | Yamada | H03F 3/187 |
| 10,674,296 | B2 * | 6/2020 | Battacharya | H04R 3/005 |
| 2015/0016635 | A1 | 1/2015 | Haas-Christensen et al. | |

FOREIGN PATENT DOCUMENTS

| | | | |
|---|---|---|---|
| JP | 2015507877 | A | 3/2015 |
| JP | 2019208128 | A | 12/2019 |

* cited by examiner

10

MICROPHONE MODULE AND MICROPHONE DEVICE

CROSS-REFERENCE TO RELATED APPLICATIONS

This application is a continuation of International Application No. PCT/JP2022/017739, filed on Apr. 13, 2022 which claims the benefit of priority of the prior Japanese Patent Application No. 2021-143899, filed on Sep. 3, 2021, the entire contents of which are incorporated herein by reference.

FIELD

The present disclosure relates to a microphone module and a microphone device.

BACKGROUND

A microphone module mounted in a vehicle interior of a vehicle is used, for example, for hands-free calling, voice recognition, and the like, and is used for active noise cancellation (ANC) to reduce noise in the vehicle interior. As represented by standards such as International Telecommunication Union-Telecommunication sector (ITU-T) P. 1120 and ITU-T P. 1130, frequency characteristics exceeding 10 kHz have been recently defined for the microphone module for hands-free calling. The microphone module for ANC is required to have the flatness of amplitude and phase in a low frequency region from about 30 Hz to 200 Hz. As described above, the microphone module for hands-free calling and the microphone module for ANC cover different frequency bands. For this reason, the microphone module for hands-free calling and the microphone module for ANC have been conventionally mounted in a vehicle as separate devices.

In addition, the microphone module mounted in the vehicle interior is required to have a small number of connection wirings in consideration of compatibility with subsequent equipment. For this reason, the microphone module mounted in the vehicle interior is desired to be of a two-wire type in which a power line for receiving DC power from an external power supply and an output line of an audio signal are shared.

However, it has been conventionally difficult to design a microphone module of two-wire type having the flatness of amplitude in a wide band from a low band to a high band that can be shared for hands-free calling and ANC.

Related techniques are disclosed in JP 2019-208128 A and JP 2015-507877 A.

An object of the present disclosure is to provide a microphone module with less connection wiring and having the flatness of amplitude in a wide band, and a microphone device.

SUMMARY

A microphone module includes a microphone element, an amplifier circuit, a high-pass filter, a buffer circuit, a first low-pass filter, a separation circuit, and a second low-pass filter. The microphone element outputs a microphone signal representing collected sound. The amplifier circuit has a band-pass characteristic of amplifying a frequency component of at least equal to or higher than a first frequency and equal to or lower than a second frequency higher than the first frequency. The amplifier circuit outputs an amplified signal obtained by amplifying a difference between the microphone signal and a reference voltage using an operational amplifier. The high-pass filter has a high-pass characteristic of causing attenuation in a low band and allowing passage in a high band. The high-pass filter outputs a high-band amplified signal obtained by high-pass filtering the amplified signal. The buffer circuit buffers the high-band amplified signal and outputting the buffered high-band amplified signal as an audio signal. The first low-pass filter has a low-pass characteristic of causing attenuation in a high band and allowing passage in a low band. The first low-pass filter outputs a low-pass bias voltage obtained by low-pass filtering the audio signal superimposed on a DC power supply. The separation circuit receives the low-pass bias voltage and outputting an internal bias voltage obtained by removing an influence of an external circuit from the low-pass bias voltage. The second low-pass filter has a low-pass characteristic of causing attenuation in a high band and allowing passage in a low band. The second low-pass filter outputs, as the reference voltage, a voltage obtained by dividing a voltage obtained by low-pass filtering the internal bias voltage by a predetermined resistance ratio. Parameters of the high-pass filter, the first low-pass filter, the second low-pass filter, and the amplifier circuit are set such that an open loop gain in a range from the first frequency to the second frequency in a circuit from an input terminal of the high-pass filter to an output terminal of the amplifier circuit via the first low-pass filter and the second low-pass filter is smaller than 0 dB.

DETAILED DESCRIPTION

Hereinafter, an embodiment of a microphone device 10 according to the present disclosure will be described with reference to the drawings.

Figure 1:
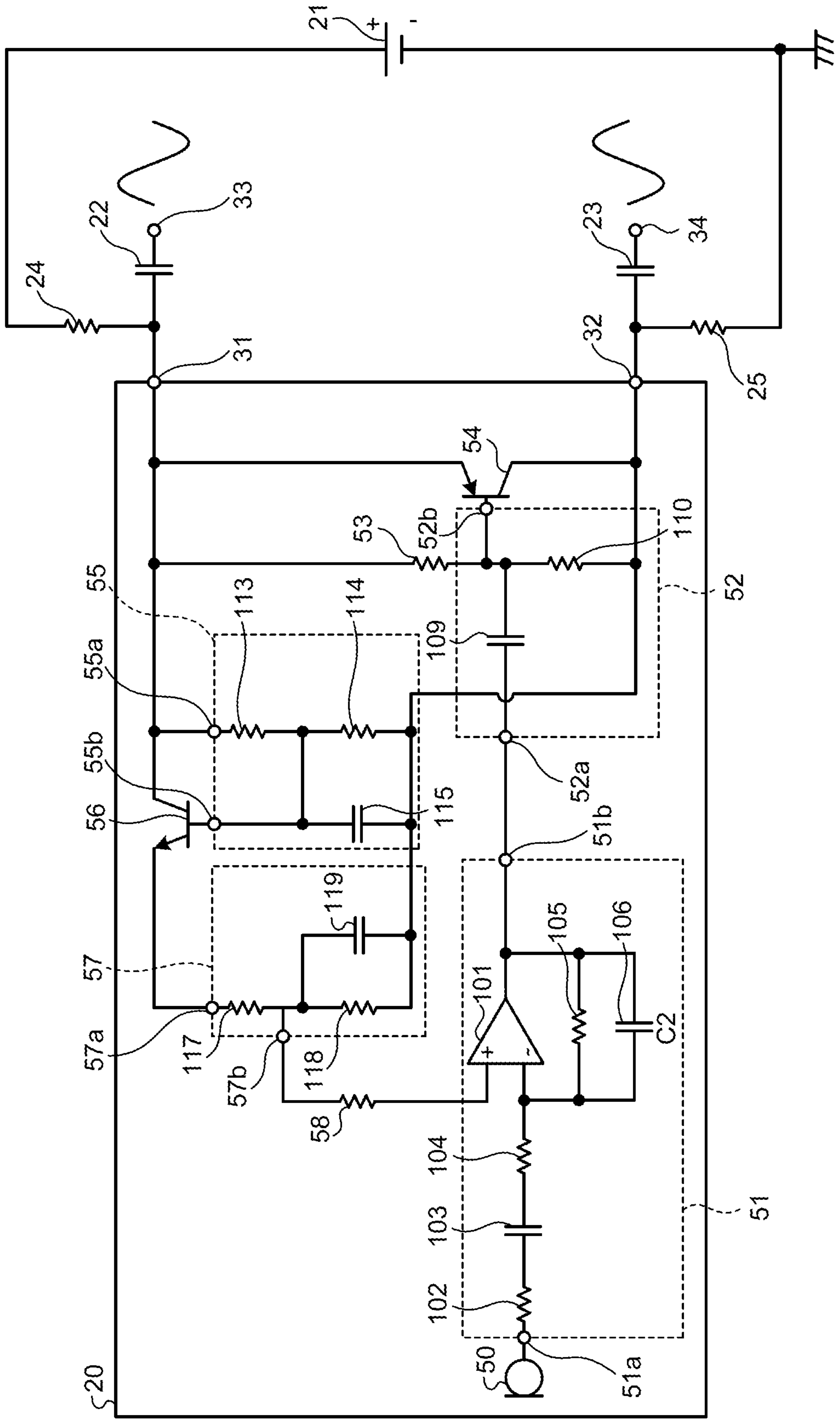
FIG. 1 is a diagram illustrating a configuration of a microphone device according to an embodiment.

FIG. 1 is a diagram illustrating a configuration of the microphone device 10 according to the embodiment. The microphone device 10 according to the embodiment is mounted in a vehicle interior of a vehicle, and outputs an audio signal used in common for hands-free calling and ANC. Note that the microphone device 10 is not limited to such an application, and may be used for other applications.

The microphone device 10 includes a microphone module 20, a DC power supply 21, a positive-side capacitor 22, a negative-side capacitor 23, a positive-side resistor 24, and a negative-side resistor 25.

The microphone module 20 collects ambient sound and outputs an audio signal representing the collected sound. In the present embodiment, the microphone module 20 outputs a differential audio signal. More specifically, the microphone module 20 outputs an audio signal on the positive side from a positive-side module output terminal 31 and outputs an audio signal on the negative side from a negative-side module output terminal 32. The audio signal on the negative side is a signal whose phase is inverted with respect to the audio signal on the positive side.

The DC power supply 21 generates a DC voltage. The DC power supply 21 supplies drive power to the microphone module 20. In the present embodiment, a negative-side terminal of the DC power supply 21 is connected to the ground.

The positive-side capacitor 22 is connected between the positive-side module output terminal 31 of the microphone module 20 and a positive-side audio output terminal 33. The positive-side capacitor 22 cuts off a DC component of the audio signal on the positive side output from the microphone module 20, and causes the audio signal on the positive side from which the DC component is cut off to be output from the positive-side audio output terminal 33.

The negative-side capacitor 23 is connected between the negative-side module output terminal 32 of the microphone module 20 and a negative-side audio output terminal 34. The negative-side capacitor 23 cuts off a DC component of the audio signal on the negative side output from the microphone module 20, and causes the audio signal on the negative side from which the DC component is cut off to be output from the negative-side audio output terminal 34.

The positive-side resistor 24 is connected between the positive-side module output terminal 31 and a positive-side terminal of the DC power supply 21. The negative-side resistor 25 is connected between the negative-side module output terminal 32 and the negative-side terminal of the DC power supply 21. As a result, in the microphone module 20, the DC voltage generated from the DC power supply 21 is applied between the positive-side module output terminal 31 and the negative-side module output terminal 32. Further, the negative-side module output terminal 32 of the microphone module 20 is connected to the ground via the negative-side resistor 25.

Such a microphone device 10 can output the differential audio signal from the positive-side module output terminal 31 and the negative-side module output terminal 32 of the microphone module 20. Specifically, the microphone device 10 can output, from the positive-side module output terminal 31, the audio signal on the positive side from which the DC component is cut off, and can output, from the negative-side module output terminal 32, the audio signal on the negative side from which the DC component is cut off.

In addition, such a microphone device 10 is supplied with, as an external bias voltage, the DC voltage generated from the DC power supply 21 between the positive-side module output terminal 31 and the negative-side module output terminal 32 of the microphone module 20. As a result, the microphone device 10 can operate using the DC voltage generated from the DC power supply 21 as a drive source. Further, in such a microphone device 10, an output line of the audio signal output from the microphone module 20 and a power line for supplying the drive power to the microphone module 20 are made common, and the connection wiring of the microphone module 20 can be reduced.

The microphone module 20 includes a microphone element 50, an amplifier circuit 51, a high-pass filter 52, a bias resistor 53, a buffer circuit 54, a first low-pass filter 55, a separation circuit 56, a second low-pass filter 57, and a reference input resistor 58.

The microphone element 50 collects ambient sound and outputs a microphone signal representing the collected sound. The microphone element 50 collects sound of a frequency component of at least equal to or higher than a first frequency and equal to or lower than a second frequency that is higher than the first frequency. In a case where the microphone device 10 is mounted in the vehicle interior of the vehicle and outputs the audio signal used for hands-free calling and ANC, the first frequency is, for example, about 30 Hz, which is the lowest frequency necessary for executing ANC. In addition, in this case, the second frequency is, for example, 10 kHz, which is the highest frequency necessary for executing hands-free calling.

The amplifier circuit 51 includes an operational amplifier 101. The amplifier circuit 51 acquires the microphone signal from the microphone element 50. The amplifier circuit 51 has a band-pass characteristic of flatly amplifying the amplitude and phase of the frequency component of at least equal to or higher than the first frequency and equal to or lower than the second frequency, and outputs an amplified signal obtained by amplifying a difference between the microphone signal and a reference voltage using the operational amplifier 101.

As an example, the amplifier circuit 51 includes the operational amplifier 101, a first resistor 102, a first capacitor 103, a second resistor 104, a third resistor 105, and a second capacitor 106. The first resistor 102, the first capacitor 103, and the second resistor 104 are connected in series between an input terminal 51*a* of the amplifier circuit 51 and an inverting input terminal of the operational amplifier 101. The first resistor 102, the first capacitor 103, and the second resistor 104 are connected in the order of the first resistor 102, the first capacitor 103, and the second resistor 104 from the side of the input terminal 51*a* of the amplifier circuit 51. The third resistor 105 is connected between the inverting input terminal of the operational amplifier 101 and an output terminal of the operational amplifier 101. The second capacitor 106 is connected between the inverting input terminal of the operational amplifier 101 and the output terminal of the operational amplifier 101.

The microphone signal output from the microphone element 50 is input to the inverting input terminal of the operational amplifier 101 via the first resistor 102, the first capacitor 103, and the second resistor 104. In addition, the reference voltage output from the second low-pass filter 57 is input to a non-inverting input terminal of the operational amplifier 101 via the reference input resistor 58. The amplifier circuit 51 having such a configuration has a band-pass characteristic, and can output, from an output terminal 51*b*, the amplified signal obtained by amplifying the difference between the microphone signal and the reference voltage.

The high-pass filter 52 acquires the amplified signal output from the amplifier circuit 51. The high-pass filter 52 has a high-pass characteristic of causing attenuation in a low band and allowing passage in a high band, and outputs a high-band amplified signal obtained by high-pass filtering the amplified signal.

The high-pass filter 52 is a filter circuit including a resistor and a capacitor. As an example, the high-pass filter 52 includes a third capacitor 109 and a fourth resistor 110. The third capacitor 109 is connected between an input terminal 52*a* of the high-pass filter 52 and an output terminal 52*b* of the high-pass filter 52. The fourth resistor 110 is connected between the output terminal 52*b* of the high-pass filter 52 and the negative-side module output terminal 32 of the microphone module 20. In the high-pass filter 52 having such a configuration, the amplified signal output from the amplifier circuit 51 is input to the input terminal 52*a*. Then, the high-pass filter 52 having such a configuration can output, from the output terminal 52*b*, the high-band amplified signal obtained by high-pass filtering the amplified signal.

The buffer circuit 54 acquires the high-band amplified signal output from the high-pass filter 52. The buffer circuit 54 buffers the high-band amplified signal and outputs the buffered high-band amplified signal as an audio signal. In the present embodiment, the buffer circuit 54 outputs an audio signal on the positive side in the differential audio signals from the positive-side module output terminal 31, and outputs an audio signal on the negative side in the differential audio signals from the negative-side module output terminal 32.

As an example, the buffer circuit 54 is an emitter-follower circuit using a bipolar transistor, and is supplied with, as a bias, the external bias voltage generated from the DC power supply 21. For example, the buffer circuit 54 is a pnp-type bipolar transistor. In this case, in the bipolar transistor functioning as the buffer circuit 54, the output terminal 52*b* of the high-pass filter 52 is connected to a base, the positive-side module output terminal 31 is connected to an emitter, and the negative-side module output terminal 32 is connected to a collector. In addition, the base of the bipolar transistor functioning as the buffer circuit 54 is connected to the positive-side module output terminal 31 via the bias resistor 53. The buffer circuit 54 having such a configuration can output the audio signal obtained by buffering the high-band amplified signal.

The first low-pass filter 55 acquires the audio signal superimposed on the DC power supply 21 via the positive-side module output terminal 31 and the negative-side module output terminal 32. The first low-pass filter 55 has a low-pass characteristic of causing attenuation in a high band and allowing passage in a low band, and outputs a low-pass bias voltage obtained by low-pass filtering the audio signal superimposed on the DC power supply 21.

The first low-pass filter 55 is a filter circuit including a resistor and a capacitor. As an example, the first low-pass filter 55 includes a fifth resistor 113, a sixth resistor 114, and a fourth capacitor 115. The fifth resistor 113 is connected between an input terminal 55*a* of the first low-pass filter 55 and an output terminal 55*b* of the first low-pass filter 55. The sixth resistor 114 is connected between the output terminal 55*b* of the first low-pass filter 55 and the negative-side module output terminal 32 of the microphone module 20. The fourth capacitor 115 is connected between the output terminal 55*b* of the first low-pass filter 55 and the negative-side module output terminal 32 of the microphone module 20. In the first low-pass filter 55 having such a configuration, the audio signal superimposed on the DC power supply 21 is supplied to the input terminal 55*a*. Then, the first low-pass filter 55 having such a configuration can output, from the output terminal 55*b*, the low-pass bias voltage obtained by low-pass filtering the audio signal superimposed on the DC power supply 21.

The separation circuit 56 acquires the low-pass bias voltage output from the first low-pass filter 55. The separation circuit 56 outputs an internal bias voltage obtained by removing the influence of an external circuit from the low-pass bias voltage. The external circuit is a circuit provided outside the microphone module 20, and is a circuit connected to the positive-side module output terminal 31 and the negative-side module output terminal 32. That is, the separation circuit 56 outputs the internal bias voltage obtained by buffering the low-pass bias voltage.

The separation circuit 56 includes a bipolar transistor. As an example, the separation circuit 56 is an npn-type bipolar transistor, in which a base is connected to the output terminal 55*b* of the first low-pass filter 55, the external bias voltage is applied to a collector, and the internal bias voltage is output from an emitter. The separation circuit 56 having such a configuration is supplied with, as a bias, the external bias voltage generated from the DC power supply 21. Then, the separation circuit 56 having such a configuration can output the low-pass bias voltage as a buffered internal bias voltage.

The second low-pass filter 57 acquires the internal bias voltage output from the separation circuit 56. The second low-pass filter 57 has a low-pass characteristic of causing attenuation in a high band and allowing passage in a low band, and outputs, as a reference voltage, a voltage obtained by dividing a voltage obtained by low-pass filtering the internal bias voltage output from the separation circuit 56 by a predetermined resistance ratio. For example, the reference voltage is a voltage representing the midpoint of the internal bias voltage. For example, the reference voltage is a voltage obtained by setting the internal bias voltage to ½.

The second low-pass filter 57 is a filter circuit including a resistor and a capacitor. As an example, the second low-pass filter 57 includes a seventh resistor 117, an eighth resistor 118, and a fifth capacitor 119. The seventh resistor 117 is connected between an input terminal 57*a* of the second low-pass filter 57 and an output terminal 57*b* of the second low-pass filter 57. The eighth resistor 118 is connected between the output terminal 57*b* of the second low-pass filter 57 and the negative-side module output terminal 32 of the microphone module 20. The fifth capacitor 119 is connected between the output terminal 57*b* of the second low-pass filter 57 and the negative-side module output terminal 32 of the microphone module 20. In the second low-pass filter 57 having such a configuration, the internal bias voltage output from the separation circuit 56 is supplied to the input terminal 57*a*. Then, the second low-pass filter 57 having such a configuration can output, from the output terminal 57*b*, the reference voltage obtained by dividing a voltage obtained by low-pass filtering the internal bias voltage supplied from the DC power supply 21 by a resistance ratio between the seventh resistor 117 and the eighth resistor 118. Note that when the reference voltage is the voltage obtained by setting the internal bias voltage to ½, the seventh resistor 117 and the eighth resistor 118 have the same resistance value.

Then, the reference voltage output from such a second low-pass filter 57 is input to the non-inverting input terminal of the operational amplifier 101 in the amplifier circuit 51 via the reference input resistor 58. As a result, the amplifier circuit 51 can output the amplified signal obtained by amplifying the difference between the microphone signal and the reference voltage using the operational amplifier 101.

Further, the microphone element 50 and the operational amplifier 101 in the amplifier circuit 51 are driven by the internal bias voltage output from the separation circuit 56. That is, the internal bias voltage is applied as a power supply voltage to the microphone element 50 and the operational amplifier 101. The influence of the external circuit is removed from the internal bias voltage by the separation circuit 56. Therefore, the microphone element 50 and the operational amplifier 101 can operate without being affected by impedance fluctuation, noise, and the like due to the external circuit, that is, a circuit provided outside the microphone module 20, such as the DC power supply 21.

Figure 2:
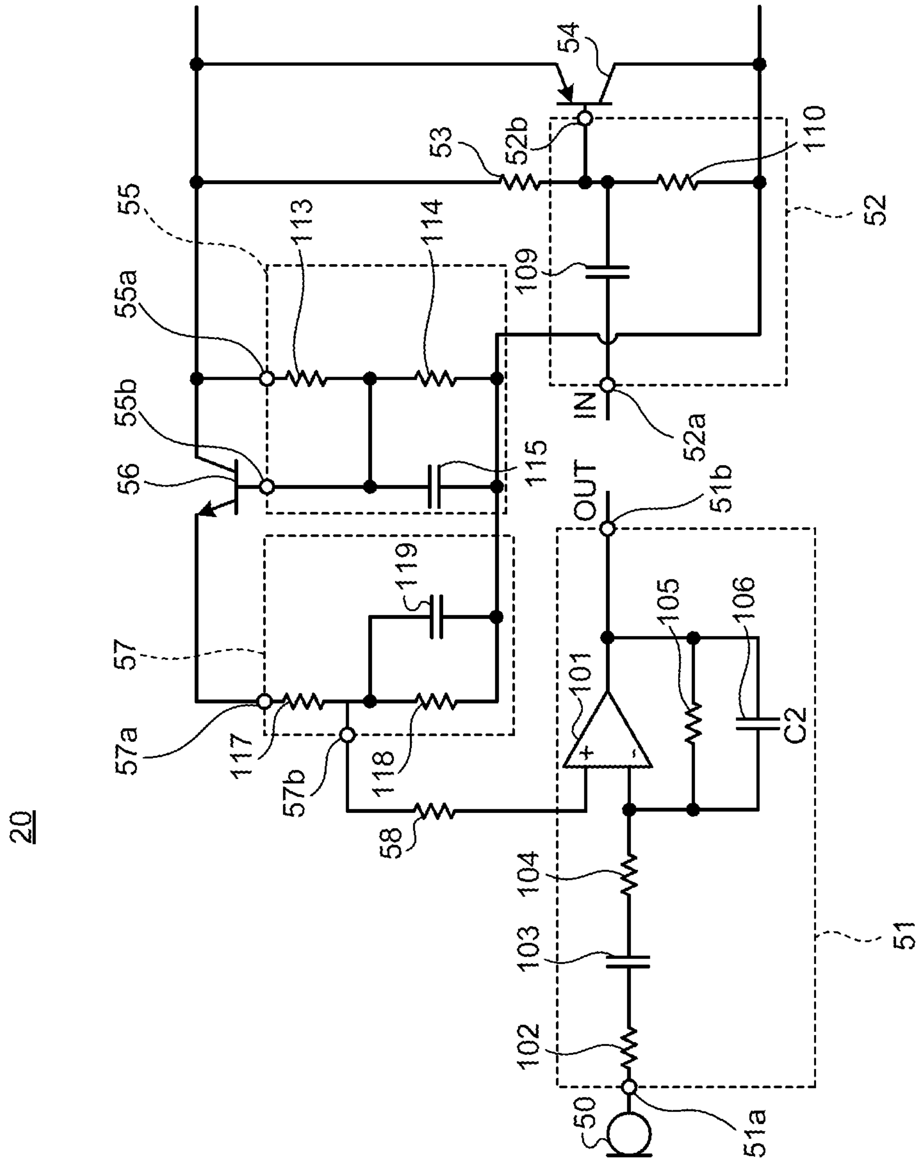
FIG. 2 is a diagram for describing an open loop gain from a high-pass filter to an amplifier circuit in a microphone module.

FIG. 2 is a diagram for describing an open loop gain from the high-pass filter 52 to the amplifier circuit 51 in the microphone module 20.

A parameter of the microphone module 20 is set such that oscillation does not occur in a frequency range from the first frequency to the second frequency. Specifically, in the microphone module 20, parameters of the high-pass filter 52, the first low-pass filter 55, the second low-pass filter 57, and the amplifier circuit 51 are set such that the open loop gain in the range from the first frequency to the second frequency in a circuit from the input terminal 52*a* of the high-pass filter 52 to the output terminal 51*b* of the amplifier circuit 51 via the first low-pass filter 55 and the second low-pass filter 57 is smaller than 0 dB. That is, in the high-pass filter 52, the first low-pass filter 55, the second low-pass filter 57, and the amplifier circuit 51, the resistance values and the capacitances are set such that the open loop gain in the range from the first frequency to the second frequency in the circuit from the input terminal 52*a* of the high-pass filter 52 to the output terminal 51*b* of the amplifier circuit 51 via the first low-pass filter 55 and the second low-pass filter 57 is smaller than 0 dB.

A loop circuit causes self-oscillation when the open loop gain is equal to or more than 0 dB. Therefore, the microphone module 20 according to the present embodiment can prevent the occurrence of self-oscillation by setting the open loop gain of the loop circuit from the input terminal 52*a* of the high-pass filter 52 to the output terminal 51*b* of the amplifier circuit 51 via the first low-pass filter 55 and the second low-pass filter 57 to be smaller than 0 dB. As a result, the microphone module 20 according to the present embodiment can output an audio signal having a flat amplitude in the frequency range from the first frequency to the second frequency.

Figure 3:
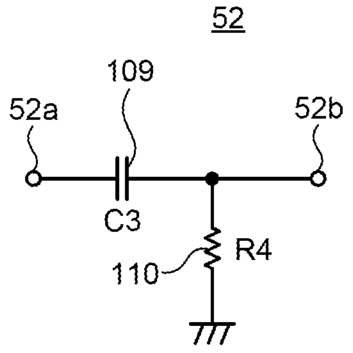
FIG. 3 is a diagram illustrating a configuration of the high-pass filter.

FIG. 3 is a diagram illustrating a configuration of the high-pass filter 52. The high-pass filter 52 is configured as illustrated in FIG. 3. In a case where the capacitance of the third capacitor 109 is $C_3$ and the resistance value of the fourth resistor 110 is $R_4$, the transfer function from the input terminal 51*a* to the output terminal 51*b* of the high-pass filter 52 is expressed as Formula (1).

$$T = \frac{R_4}{R_4 + \frac{1}{j\omega C_3}} \tag{1}$$

Figure 4:
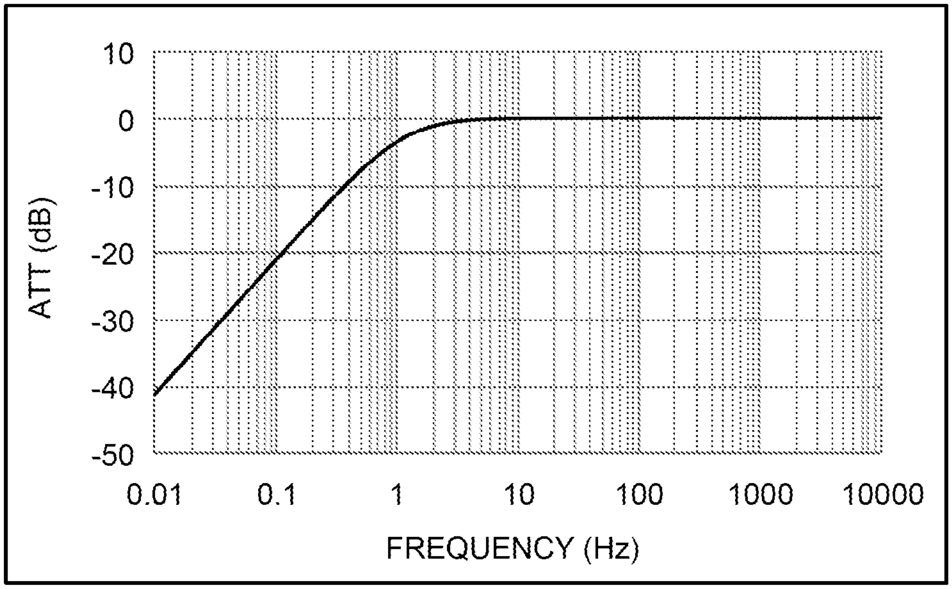
FIG. 4 is a diagram illustrating a frequency characteristic of the high-pass filter.

FIG. 4 is a diagram illustrating a frequency characteristic of an attenuation amount of the high-pass filter 52. As illustrated in FIG. 4, the high-pass filter 52 has a frequency characteristic of causing attenuation in a low band that is a frequency range lower than a predetermined cutoff frequency and allowing passage in a high band that is a frequency range equal to or higher than the predetermined cutoff frequency.

Figure 5:
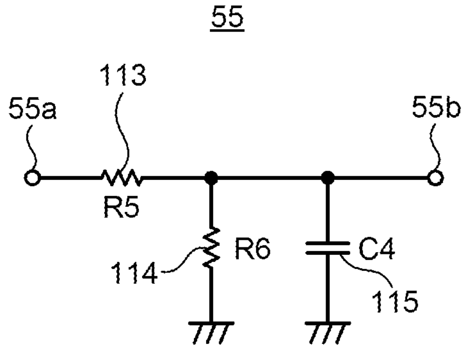
FIG. 5 is a diagram illustrating a configuration of a first low-pass filter.

FIG. 5 is a diagram illustrating a configuration of the first low-pass filter 55. The first low-pass filter 55 is configured as illustrated in FIG. 5. In a case where the resistance value of the fifth resistor 113 is $R_5$, the resistance value of the sixth resistor 114 is $R_6$, and the capacitance of the fourth capacitor 115 is $C_4$, the transfer function from the input terminal 55*a* to the output terminal 55*b* of the first low-pass filter 55 is expressed as Formula (2).

$$T = \frac{(R_6//C_4)}{R_5 + (R_6//C_4)} = \frac{\dfrac{R_6\frac{1}{j\omega C_4}}{R_6 + \frac{1}{j\omega C_4}}}{R_5 + \dfrac{R_6\frac{1}{j\omega C_4}}{R_6 + \frac{1}{j\omega C_4}}} \tag{2}$$

Figure 6:
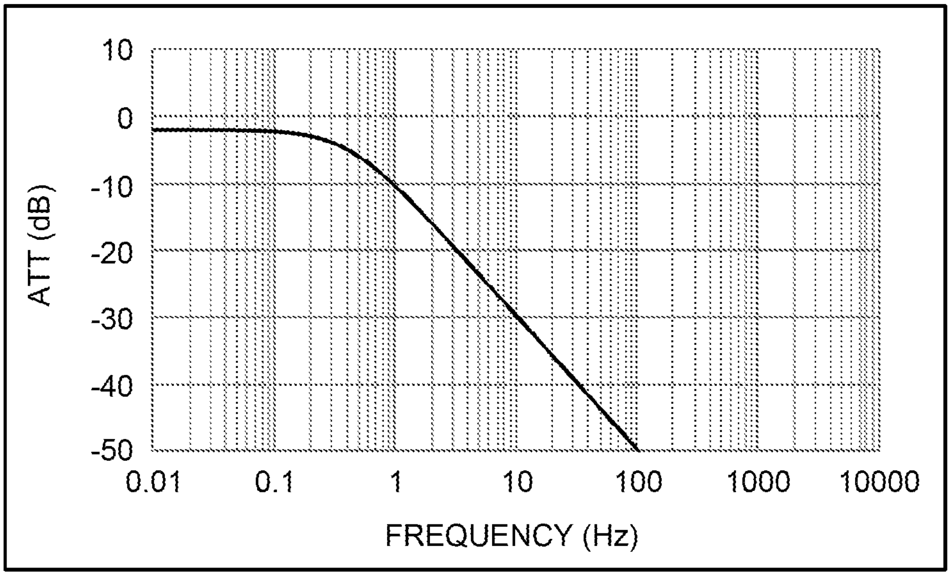
FIG. 6 is a diagram illustrating a frequency characteristic of the first low-pass filter.

FIG. 6 is a diagram illustrating a frequency characteristic of an attenuation amount of the first low-pass filter 55. As illustrated in FIG. 6, the first low-pass filter 55 has a frequency characteristic of causing attenuation in a high band that is a frequency range equal to or higher than a predetermined cutoff frequency and allowing passage in a low band that is a frequency range lower than the predetermined cutoff frequency.

Figure 7:
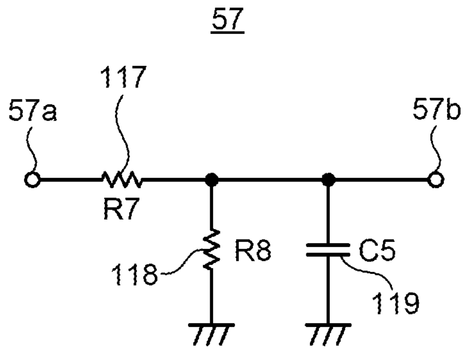
FIG. 7 is a diagram illustrating a configuration of a second low-pass filter.

FIG. 7 is a diagram illustrating a configuration of the second low-pass filter 57. The second low-pass filter 57 is configured as illustrated in FIG. 7. In a case where the resistance value of the seventh resistor 117 is $R_7$, the resistance value of the eighth resistor 118 is $R_8$, and the capacitance of the fifth capacitor 119 is $C_5$, the transfer function from the input terminal 57*a* to the output terminal 57*b* of the second low-pass filter 57 is expressed as Formula (3).

$$T = \frac{(R_8//C_5)}{R_7 + (R_8//C_5)} = \frac{\dfrac{R_8\frac{1}{j\omega C_5}}{R_8 + \frac{1}{j\omega C_5}}}{R_7 + \dfrac{R_8\frac{1}{j\omega C_5}}{R_8 + \frac{1}{j\omega C_5}}} \tag{3}$$

Figure 8:
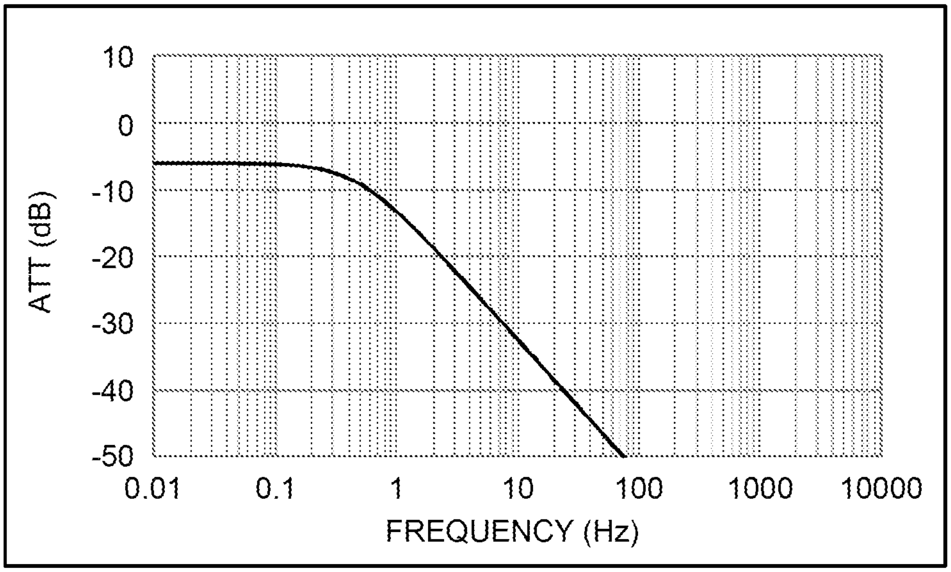
FIG. 8 is a diagram illustrating a frequency characteristic of the second low-pass filter.

FIG. 8 is a diagram illustrating a frequency characteristic of an attenuation amount of the second low-pass filter 57. As illustrated in FIG. 8, the second low-pass filter 57 has a frequency characteristic of causing attenuation in a high band that is a frequency range equal to or higher than a predetermined cutoff frequency and allowing passage in a low band that is a frequency range lower than the predetermined cutoff frequency.

Figure 9:
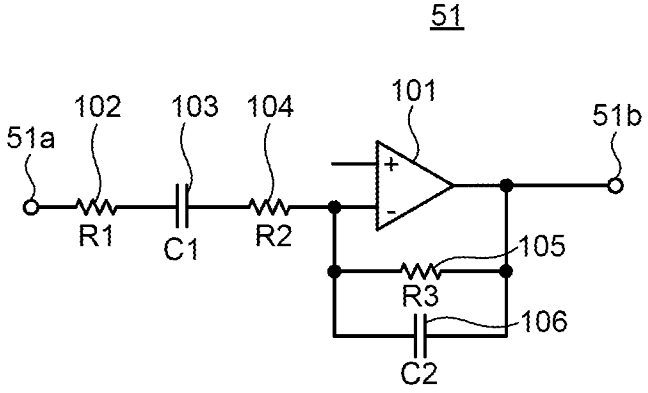
FIG. 9 is a diagram illustrating a configuration of the amplifier circuit.

FIG. 9 is a diagram illustrating a configuration of the amplifier circuit 51. The amplifier circuit 51 is configured as illustrated in FIG. 9. In a case where the resistance value of the first resistor 102 is $R_1$, the capacitance of the first capacitor 103 is $C_1$, the resistance value of the second resistor 104 is $R_2$, the resistance value of the third resistor 105 is $R_3$, and the capacitance of the second capacitor 106 is $C_2$, the transfer function from the input terminal 51*a* to the output terminal 51*b* of the amplifier circuit 51 is expressed as Formula (4).

$$G = \frac{(R_3//C_2)}{R_1 + \frac{1}{j\omega C_1} + R_2} = \frac{\frac{R_3 \frac{1}{j\omega C_2}}{R_3 + \frac{1}{j\omega C_2}}}{R_1 + \frac{1}{j\omega C_2} + R_2} \tag{4}$$

Figure 10:
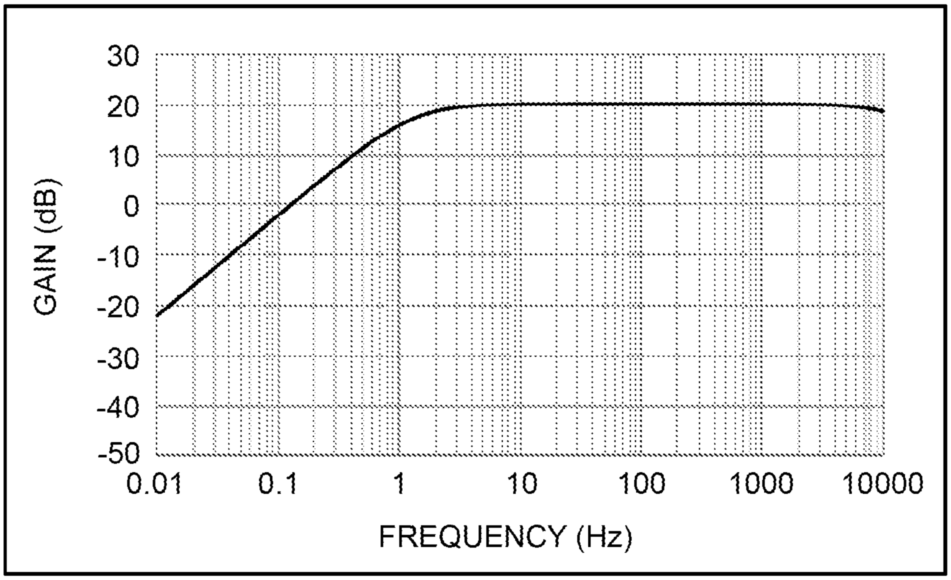
FIG. 10 is a diagram illustrating a frequency characteristic of the amplifier circuit.

FIG. 10 is a diagram illustrating a frequency characteristic of an amplification amount of the amplifier circuit 51. As illustrated in FIG. 10, the amplifier circuit 51 has a frequency characteristic of causing amplification flatly in the range from the first frequency to the second frequency with a predetermined amplification factor, decreasing the amplification factor in the low band lower than the first frequency as the frequency decreases, and decreasing the amplification factor in the high band higher than the second frequency as the frequency increases. That is, the amplifier circuit 51 has a band-pass characteristic.

Figure 11:
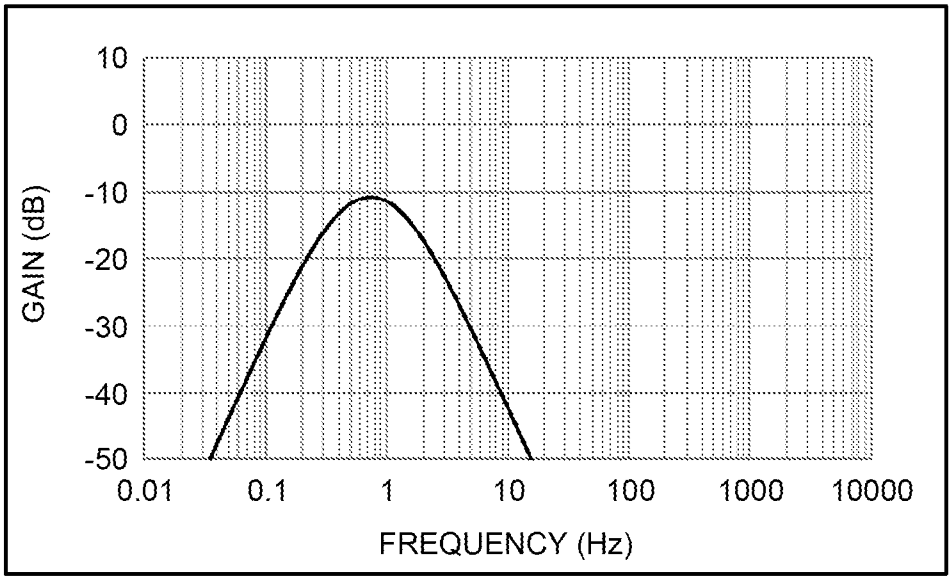
FIG. 11 is a diagram illustrating a frequency characteristic of the open loop gain from the high-pass filter to the amplifier circuit.

FIG. 11 is a diagram illustrating a frequency characteristic of the open loop gain from the high-pass filter 52 to the amplifier circuit 51.

A transfer characteristic of the circuit from the high-pass filter 52 to the amplifier circuit 51 is a characteristic obtained by adding transfer characteristics of the high-pass filter 52, the first low-pass filter 55, the second low-pass filter 57, and the amplifier circuit 51. Therefore, the frequency characteristic of the open loop gain from the high-pass filter 52 to the amplifier circuit 51 is a characteristic as illustrated in FIG. 11 obtained by adding the frequency characteristics of FIGS. 4, 6, 8, and 10.

As illustrated in FIG. 11, the frequency characteristic of the open loop gain of the circuit from the high-pass filter 52 to the amplifier circuit 51 is smaller than 0 dB in all frequency ranges. For example, the frequency characteristic illustrated in FIG. 11 is the highest in the vicinity of 1 Hz, but is about −10 dB. Therefore, the parameter of the microphone module 20 is set so as not to self-oscillate in the loop circuit formed inside.

Figure 12:
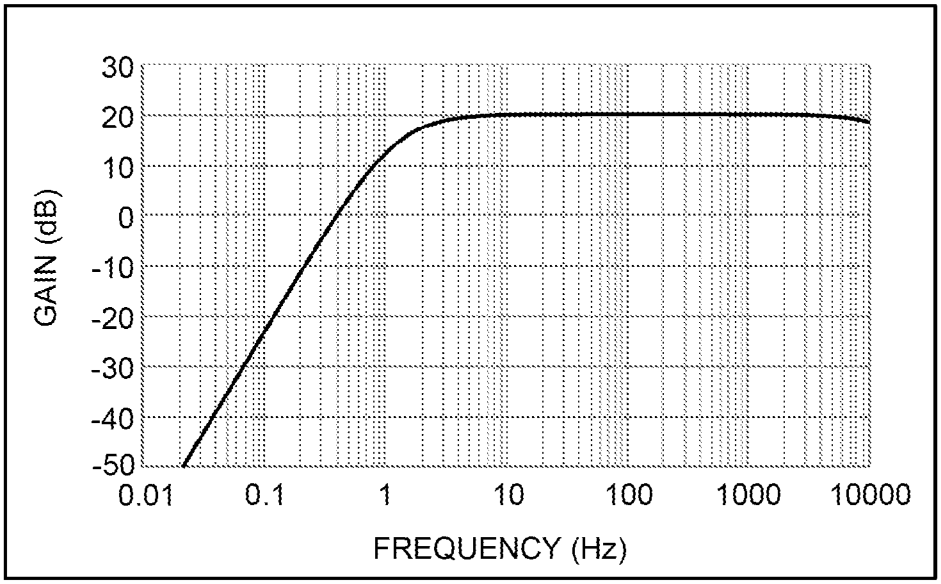
FIG. 12 is a diagram illustrating a frequency characteristic of the microphone module.

FIG. 12 is a diagram illustrating a frequency characteristic from the input terminal 51*a* of the amplifier circuit 51 to the output terminal 52*b* of the high-pass filter 52 in the microphone module 20.

The entire frequency characteristic of the microphone module 20 is a characteristic obtained by adding the frequency characteristic of the microphone element 50 to the frequency characteristic illustrated in FIG. 12. As illustrated in FIG. 12, the microphone module 20 has a frequency characteristic in which an amplification factor from 10 Hz to 10 kHz is flat. As a result, the microphone module 20 does not cause self-oscillation from the first frequency (for example, 30 Hz) to the second frequency (10 kHz), has a flat amplitude, and can output an accurate audio signal with little distortion.

As described above, the microphone device 10 according to the present embodiment has the flatness of amplitude in the wide band and the flatness of phase in the low band, and can reduce the connection wiring between the microphone module 20 and an external device.

Figure 13:
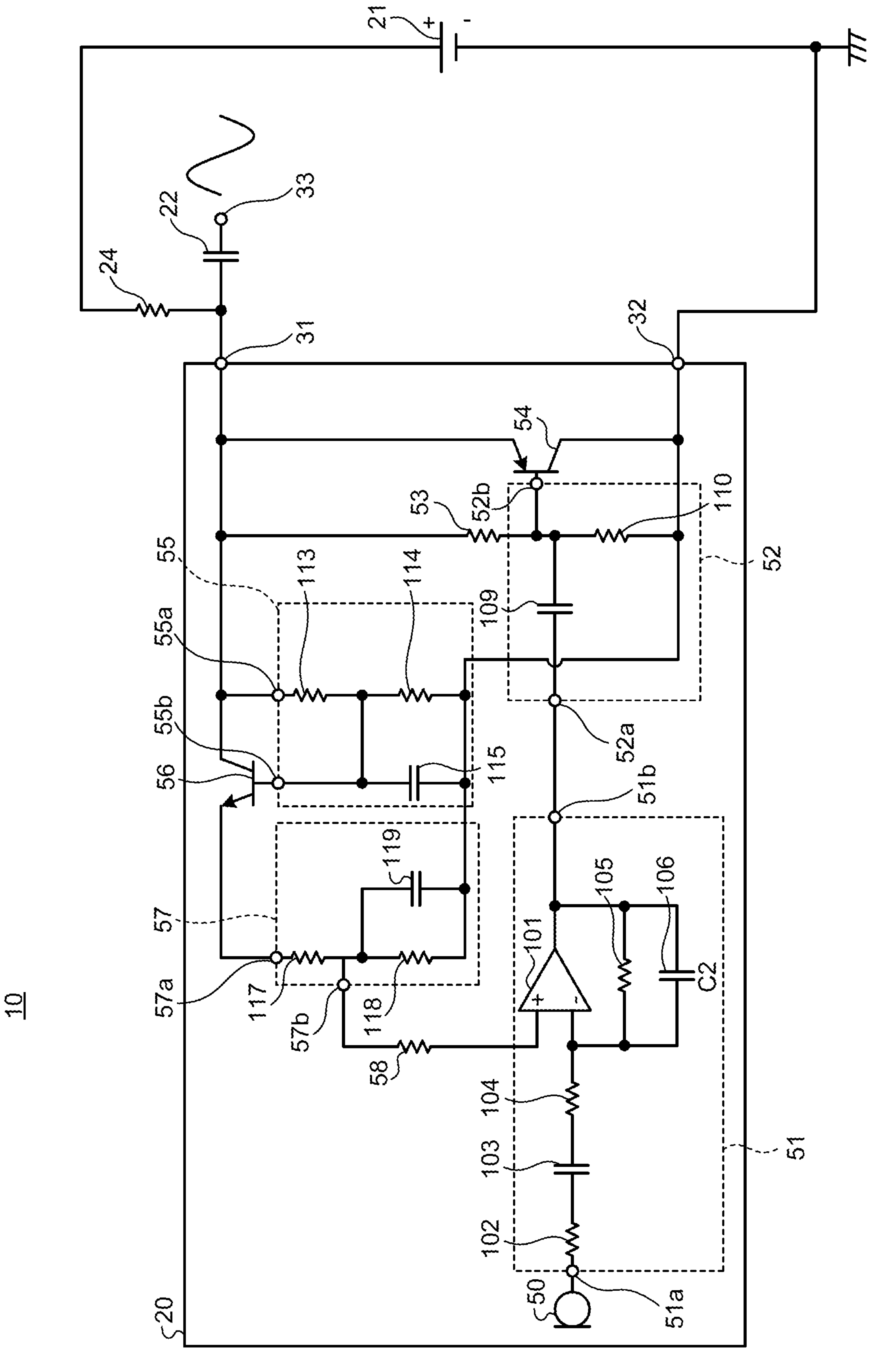
FIG. 13 is a diagram illustrating a configuration of a modification of the microphone device.

FIG. 13 is a diagram illustrating a configuration of the microphone device 10 according to a modification.

The microphone module 20 according to the modification outputs a single-ended audio signal instead of the differential audio signal. The microphone device 10 according to the modification includes the microphone module 20, the DC power supply 21, the positive-side capacitor 22, and the positive-side resistor 24. In the microphone module 20 according to the modification, the negative-side module output terminal 32 is directly connected to the ground. Each of the positive-side capacitor 22 and the positive-side resistor 24 has the same connection relationship as that of FIG. 1.

The microphone device 10 according to such a modification can output an audio signal from the positive-side module output terminal 31 of the microphone module 20. Specifically, the microphone device 10 according to the modification outputs, from the positive-side module output terminal 31, an audio signal from which a DC component is cut off.

Further, in the microphone device 10 according to the modification, a DC voltage generated from the DC power supply 21 can be applied, as an external bias voltage, between the positive-side module output terminal 31 and the negative-side module output terminal 32 of the microphone module 20. Therefore, in such a microphone device 10, the output line of the audio signal output from the microphone module 20 and the power line for supplying the drive power to the microphone module 20 can be made common, and the connection wiring of the microphone module 20 can be reduced.

Then, the microphone module 20 has the same configuration as that of FIG. 1. Therefore, the microphone device 10 according to the modification having such a configuration also has the flatness of amplitude in the wide band and the flatness of phase in the low band, and can reduce the connection wiring between the microphone module 20 and an external device.

In addition, the above embodiments are merely examples of implementation in implementing the present disclosure, and the technical scope of the present disclosure should not be interpreted in a limited manner by these embodiments. That is, the present disclosure can be implemented in various forms without departing from the gist or main features of the present disclosure.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A microphone module comprising:

a microphone element outputting a microphone signal representing collected sound;

an amplifier circuit having a band-pass characteristic of amplifying a frequency component of at least equal to or higher than a first frequency and equal to or lower than a second frequency higher than the first frequency, the amplifier circuit outputting an amplified signal obtained by amplifying a difference between the microphone signal and a reference voltage using an operational amplifier;

a high-pass filter having a high-pass characteristic of causing attenuation in a low band and allowing passage in a high band, the high-pass filter outputting a high-band amplified signal obtained by high-pass filtering the amplified signal;

a buffer circuit buffering the high-band amplified signal and outputting the buffered high-band amplified signal as an audio signal;

a first low-pass filter having a low-pass characteristic of causing attenuation in a high band and allowing passage in a low band, the first low-pass filter outputting a low-pass bias voltage obtained by low-pass filtering the audio signal superimposed on a DC power supply;

a separation circuit receiving the low-pass bias voltage and outputting an internal bias voltage obtained by removing an influence of an external circuit from the low-pass bias voltage; and a second low-pass filter having a low-pass characteristic of causing attenuation in a high band and allowing passage in a low band, the second low-pass filter outputting, as the reference voltage, a voltage obtained by dividing a voltage obtained by low-pass filtering the internal bias voltage by a predetermined resistance ratio, wherein parameters of the high-pass filter, the first low-pass filter, the second low-pass filter, and the amplifier circuit are set such that an open loop gain in a range from the first frequency to the second frequency in a circuit from an input terminal of the high-pass filter to an output terminal of the amplifier circuit via the first low-pass filter and the second low-pass filter is smaller than 0 dB.

2. The microphone module according to claim 1, wherein the high-pass filter includes a resistor and a capacitor.

3. The microphone module according to claim 1, wherein the buffer circuit is an emitter-follower circuit using a bipolar transistor, and is supplied with, as a bias, an external bias voltage output from the DC power supply.

4. The microphone module according to claim 1, wherein the first low-pass filter includes a resistor and a capacitor.

5. The microphone module according to claim 1, wherein the separation circuit is a bipolar transistor having a base connected to an output terminal of the first low-pass filter, a collector to which the DC power supply is applied, and an emitter outputting the internal bias voltage.

6. The microphone module according to claim 1, wherein the second low-pass filter includes a resistor and a capacitor.

7. The microphone module according to claim 1, wherein the operational amplifier has an inverting input terminal to which the microphone signal is input, and a non-inverting input terminal to which the reference voltage is applied.

8. The microphone module according to claim 1, wherein the microphone element and the operational amplifier are driven by the internal bias voltage.

9. A microphone device comprising:

the microphone module according to claim 1 having a positive-side module output terminal outputting the audio signal on a positive side, and a negative-side module output terminal outputting the audio signal on a negative side;

a positive-side capacitor connected between the positive-side module output terminal and a positive-side audio output terminal;

a negative-side capacitor connected between the negative-side module output terminal and a negative-side audio output terminal;

a positive-side resistor connected between the positive-side module output terminal and a positive-side terminal of the DC power supply; and a negative-side resistor connected between the negative-side module output terminal and a negative-side terminal of the DC power supply.

10. A microphone device comprising:

the microphone module according to claim 1 having a positive-side module output terminal outputting the audio signal;

a positive-side capacitor connected between the positive-side module output terminal and a positive-side audio output terminal; and a positive-side resistor connected between the positive-side module output terminal and a positive-side terminal of the DC power supply.

* * * * *